UNITED STATES PATENT OFFICE.

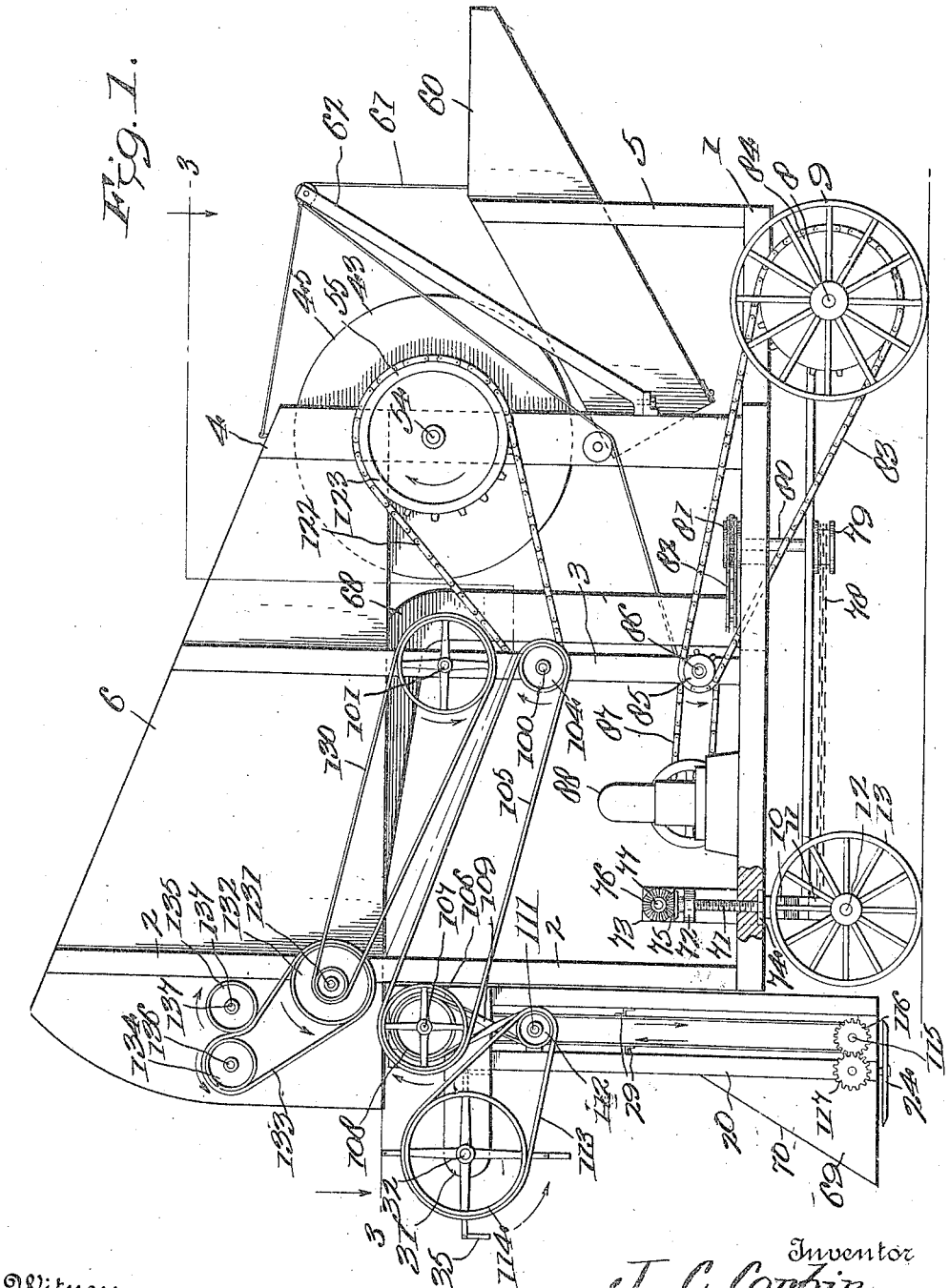

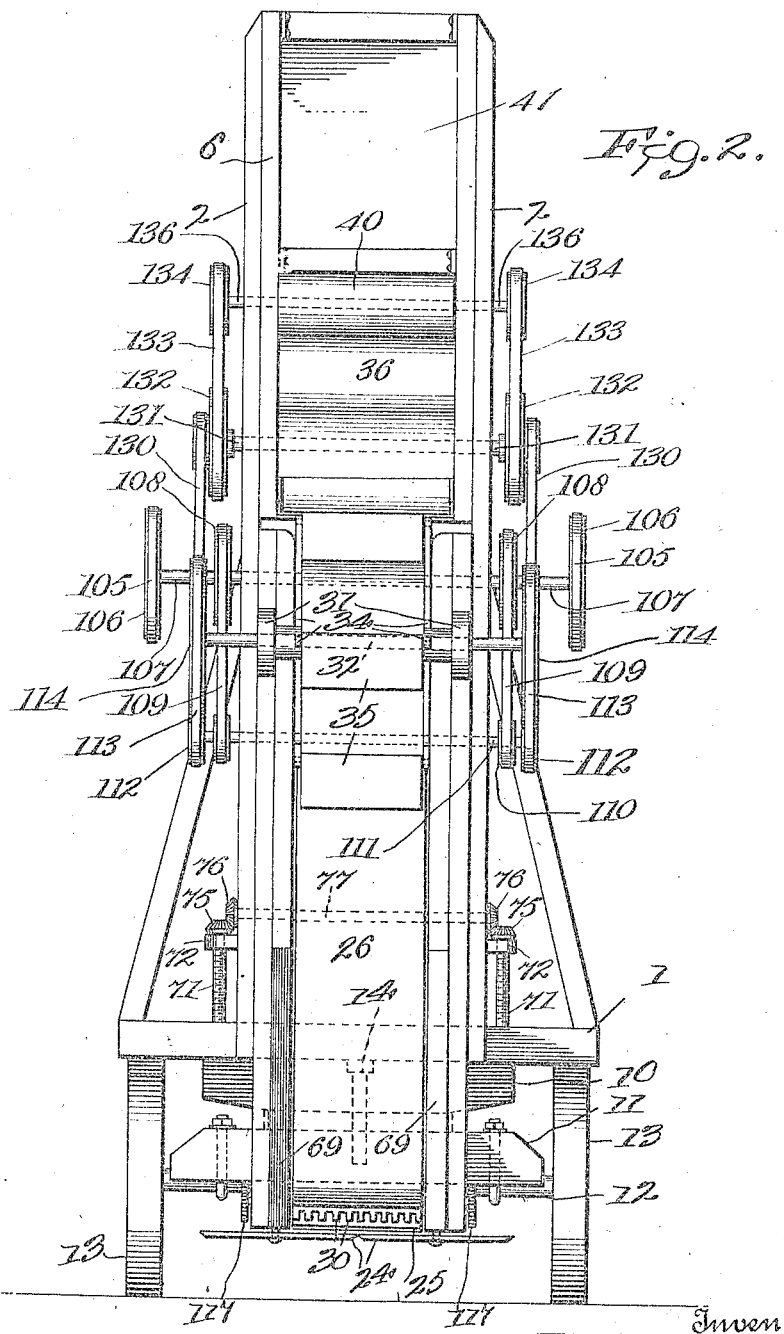

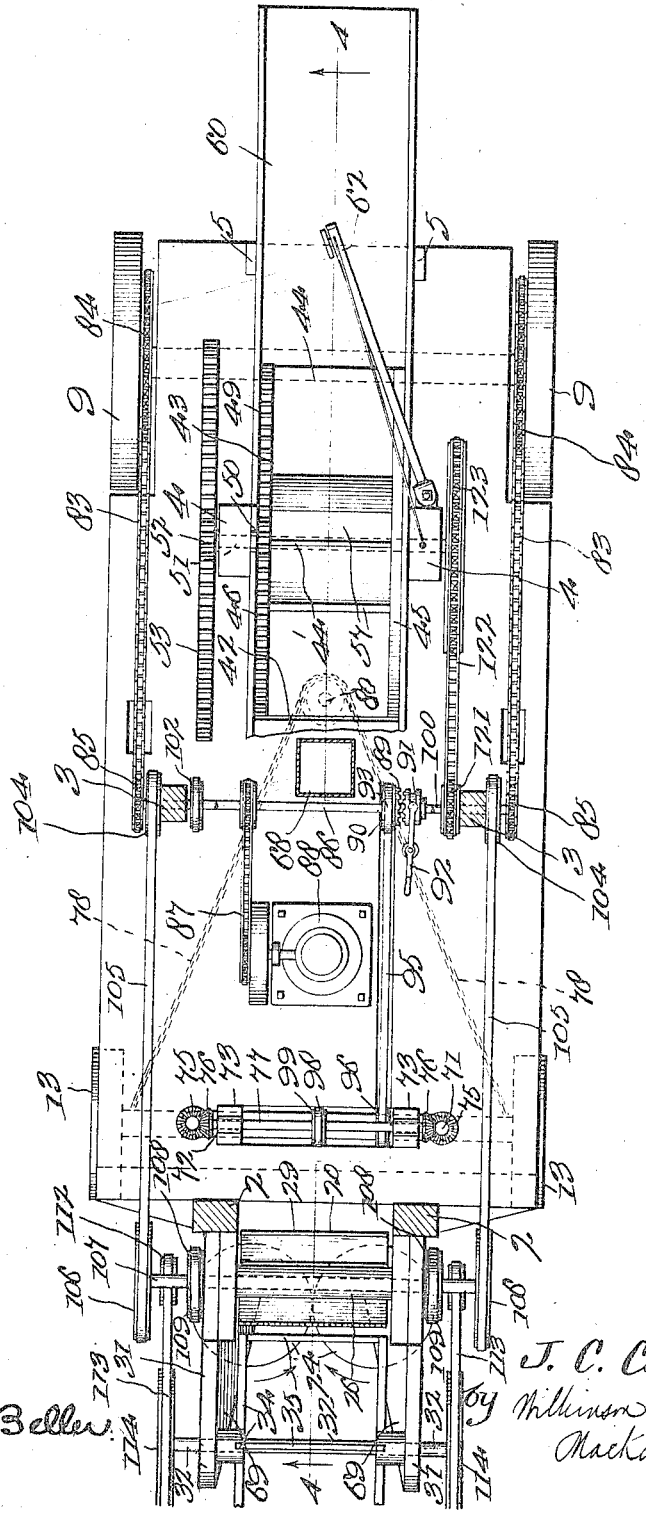

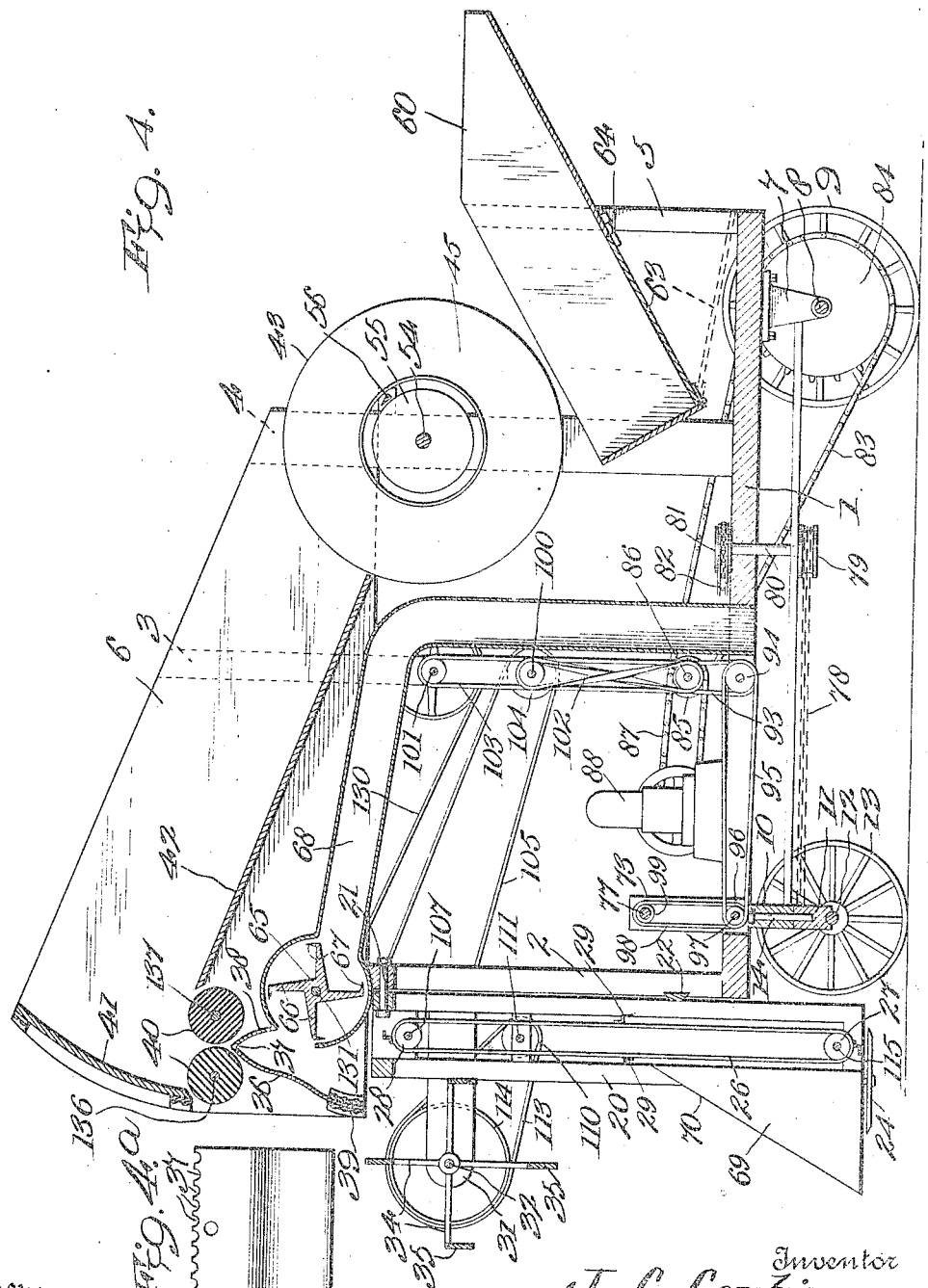

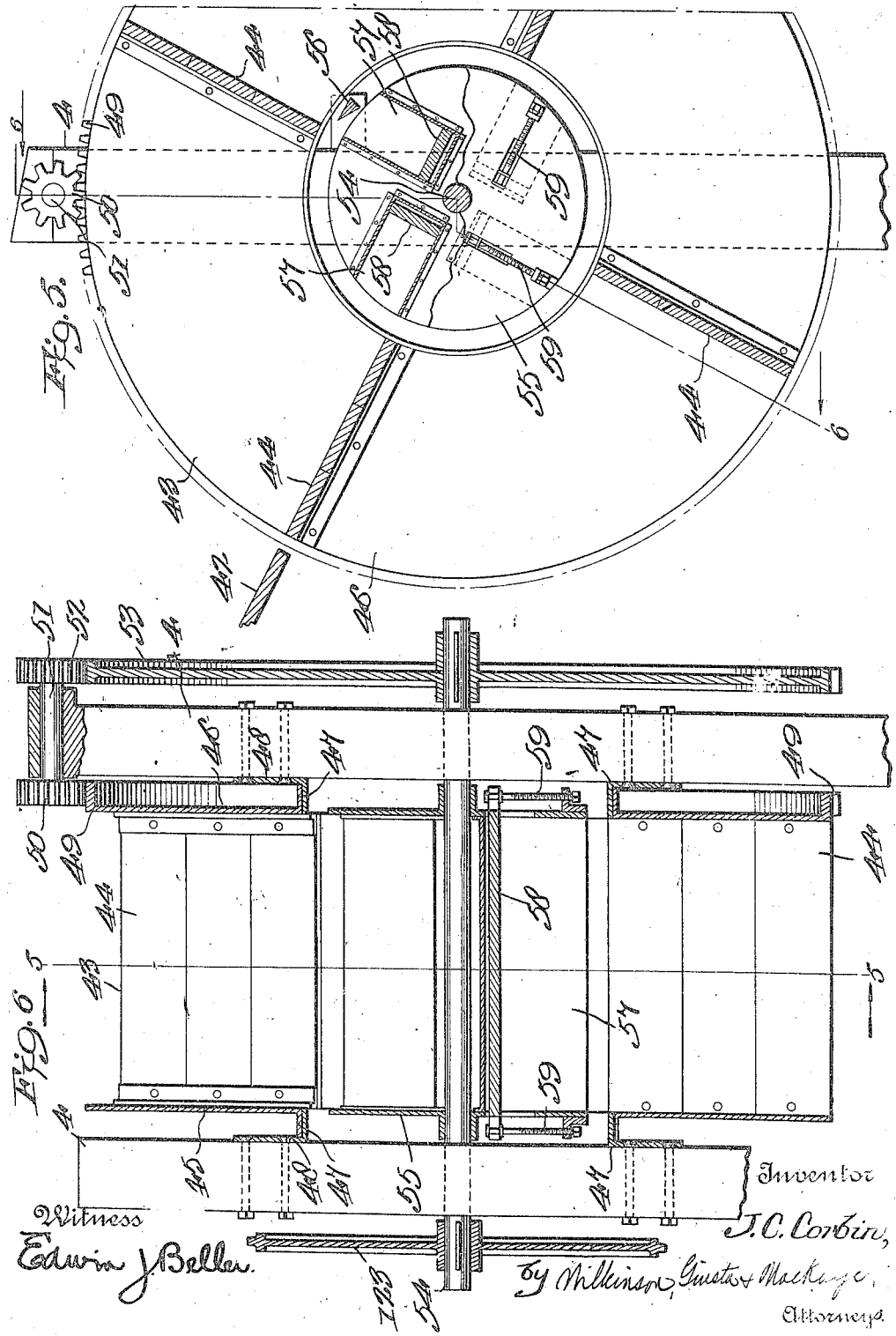

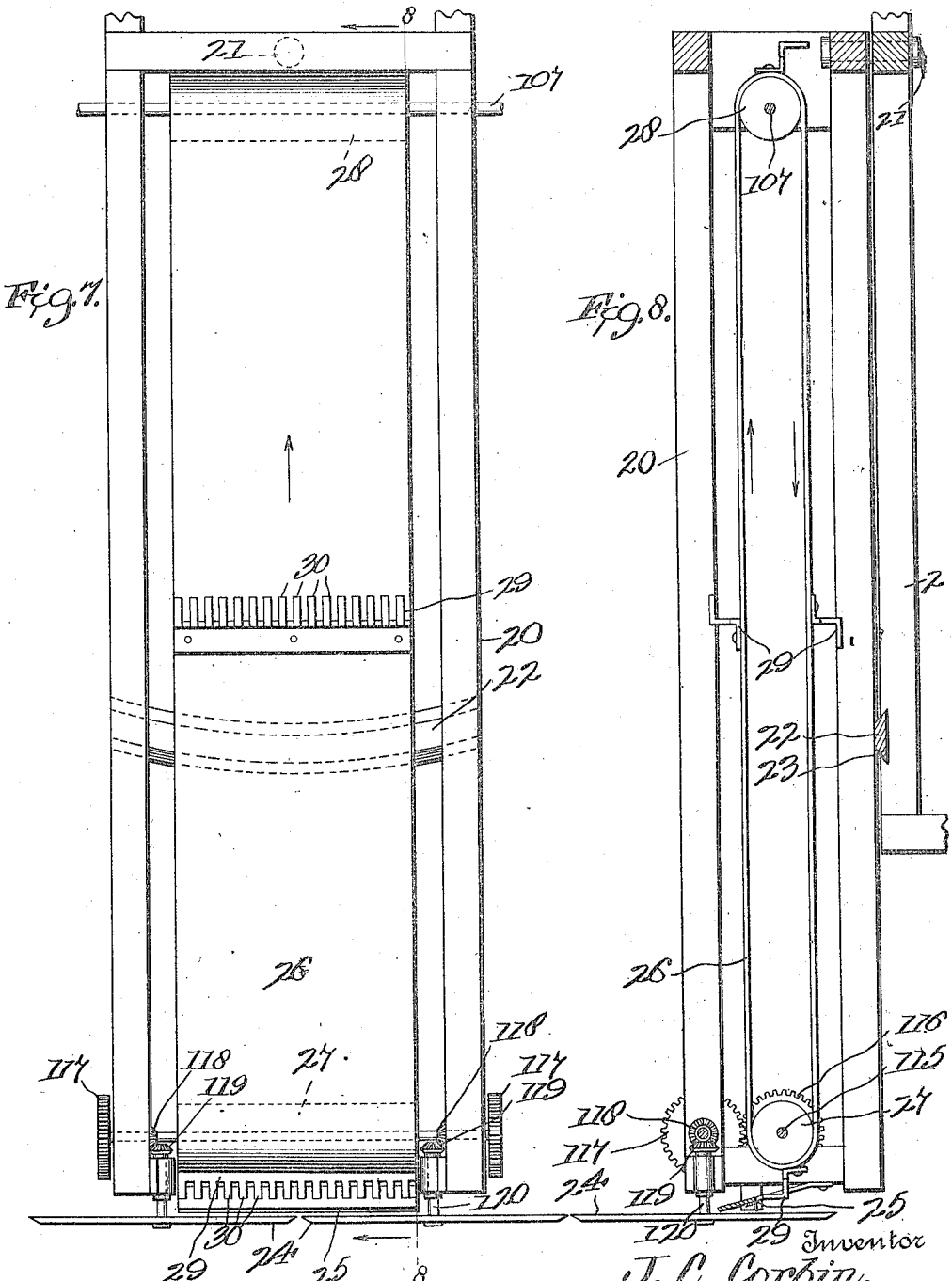

JOHN CURRY CORBIN, OF MANSFIELD, LOUISIANA.

SUGAR-CANE HARVESTER.

1,184,624.　　　　Specification of Letters Patent.　　Patented May 23, 1916.

Application filed July 29, 1915. Serial No. 42,540.

*To all whom it may concern:*

Be it known that I, JOHN CURRY CORBIN, a citizen of the United States, residing at Mansfield, in the parish of De Soto and State of Louisiana, have invented certain new and useful Improvements in Sugar-Cane Harvesters; and I do hereby declare the following to be a full, clear, and exact description of the invention, such as will enable others skilled in the art to which it appertains to make and use the same.

My invention relates to improvements in sugar can harvesters, and it is intended to provide apparatus which will cut the standing cane at the height required above the ground, strip the leaves and trash from same, cut off an adjustable length of the green top from the individual stalks, and will deliver the stalks after they have been cut, stripped and topped to a suitable receptacle, whence they may be lifted in bundles by a suitable derrick, or otherwise removed.

The apparatus is adapted to be propelled and operated by suitable motive power, preferably an internal combustion engine; and suitable means for propelling the vehicle and driving the several parts are provided.

My invention will be understood by reference to the accompanying drawings, in which similar parts are indicated by similar reference symbols throughout the several views.

Figure 1 is a side elevation of the complete apparatus, parts being broken away and parts being omitted for the sake of clearness in the drawings; Fig. 2 is a view of the apparatus as seen from the left of Fig. 1; Fig. 3 shows a section along the broken line 3—3 of Fig. 1, and looking down, parts being omitted for the sake of clearness in the drawings; Fig. 4 shows a section along the broken line 4—4 of Fig. 3, and looking in the direction of the arrows; Fig. 4ᵃ is a detail of the stripper; Fig. 5 shows a section through the topping drum, along the lines 4—4 of Fig. 3 and 5—5 of Fig. 6, the parts being shown on a larger scale, and illustrates the mode of cutting the green tops off the stalks; Fig. 6 shows a section along the line 6—6 of Fig. 5, and looking in the direction of the arrows; Fig. 7 is a front view of the frame; conveyer and cutting knives mounted at the front end of the machine, parts being shown on a larger scale than in Fig. 2; and Fig. 8 shows a section along the line 8—8 of Fig. 7, and looking in the direction of the arrows.

1 represents the main frame or wagon body, which is provided with the uprights 2, 3, 4 and 5, and with the sheathing 6 near the top thereof, as shown most clearly in Fig. 1. The rear end of this frame is provided with journal bearings 7 for the axle 8 of the traction wheels 9. Near the front end of the frame a bolster 10 is provided which is mounted above the bolster 11, supported by the front axle 12 on which are mounted the front wheels 13. The bolsters 10 and 11 are pivoted together by the king bolt 14, as shown most clearly in Fig. 4. The front end of the main frame is raised or lowered relative to the front axle, so as to vary the height of the cutting knives, as will be hereinafter described.

A secondary frame 20 is swingingly connected to the upright 2 of the main frame, as by means of the pivot pin 21, and this secondary frame is steadied by means of the arc-shaped, dove-tailed guides 22, traveling in the guideway 23 in the upright 2 of the main frame, as shown most clearly in Figs. 7 and 8. Projecting from the bottom of this secondary frame are the rotary cutting knives 24 which are driven in the direction of the arrows as shown in Fig. 3. Projecting also from the bottom of the secondary frame 20 is the scoop 25, see Figs. 7 and 8, which serves to scrape any dirt off the rotary cutting knives, and also to prevent stalks of cane from wedging in under the frame. Mounted in the secondary frame 20 is the band conveyer 26 which passes over pulleys 27 and 28, see Fig. 8, and is provided with a series of Z-shaped bars 29, which are provided with teeth 30, as shown most clearly in Figs. 7 and 8. The means by which the conveyer and the cutting knives are driven will be hereinafter described. The secondary frame 20 is provided near its top with the arms 31 in which the shaft 32 of the paddle wheel is mounted. This paddle wheel is composed of two spiders, each having a series of spokes 34, between the ends of which spokes are hinged the paddles 35, which are intended to press the cane in toward the conveyer and cause the same to be lifted thereby. Mounted above the conveyer is the stripper 36, which is preferably provided with a series of teeth 37, as shown in Fig. 4ª. This stripper is preferably made of sheet metal, so as to yield as the tops of the cane are pressed up into the V-shaped pocket formed by the upper end of the stripper plate and the adjacent diaphragm 38, see Fig. 4. The stripper plate 36 is secured to the sheathing 6 in any convenient way, as by means of the angle irons 39, shown in Fig. 4.

The stalks of cane passing through the stripper are caught by the gripping rollers 40, and, being directed by the deflector plate 41, fall over on the bottom 42 of the chute whose sides are the sheathing 6. The stalks of cane slide down said chute with the tops down, and these tops project into segments of the topping drum 43, shown in detail in Figs. 5 and 6. This topping drum consists of two separate concentric wheels, the outer wheel being in the form of a ring having radial partitions 44, and this ring has annular heads 45 and 46, each of which is provided with an inner flange 47, which inner flanges are journaled on bearing rings 48, fast to the uprights 4 of the main frame. The annular head 46 carries a circular rack 49 which meshes with the pinion 50, mounted on the shaft 51, which shaft carries a pinion 52 meshing with the gear wheel 53 splined on the shaft 54, carrying the inner wheel 55. Thus, the rotation of the inner wheel will also cause the outer annular wheel to rotate in the same direction, and the pinions 50 and 52 being preferably of the same diameter, the angular speed of the inner wheel will be the same as that of the outer annular wheel. Between these two wheels a topping knife 56 (see Fig. 5) is mounted, which cuts off the green tops of the cane stalks as the two wheels revolve.

Since the length of the green tops of the cane stalks varies materially with the kind of cane being harvested, it is desirable to adjust the length of the portion cut off, and for this purpose I provide in the inner wheel a series of pockets 57 having adjustable bottoms 58, which are moved up or down by means of the adjusting screws 59 (see Figs. 5 and 6), and thus the depth of the pocket may be varied at will, and the corresponding length of top of the stalk to be cut off is adjustably controlled.

As the two wheels constituting the topping drum revolve, after the tops have been cut off, the longer portions, constituting the bottoms of the stalks, and the separate tops will both fall into the hopper 60. The tops will fall in the lower part of the hopper, and the long stalks of cane will fall into the upper part of the hopper; and the usual cane slings being provided in the hopper, the long stalks of cane may be hoisted out by the hoisting rope 61 leading from the derrick 62. In order to remove the tops when desired from the hopper, the bottom of the hopper may be provided with a hinged door 63, which may be held in the closed position by suitable bolts 64. When this door is lowered, it will serve as a chute for the contents of the hopper, and the tops may be collected in any suitable receptacle, not shown. These tops are valuable as stock food, and it is desirable not to lose same when the cane is harvested.

I have thus described the movement of the cane stalks from the ground to the hopper. These stalks when freshly cut are generally more or less covered over the upper portion with dried leaves called "trash", and above this with green leaves; and this trash is loosened by the paddle wheel 33, and the trash and leaves are sucked into the fan 65 which has arms 66 terminating in cutting blades 67, which tend to catch in the leaves and trash and add to the effect of the suction of the fan, which blows the leaves and trash down through the air chute 68 to the ground. As the stalks are forced up against the stripper, the leaves will, of course, be pressed downward so they will be in position to be caught by the stripping knives on the suction fan. To direct the stalks and the cane to the conveyer the swinging frame 20 is provided with guide members 69 which are preferably flared inward and upward, as at 70, see Figs. 1, 2, 3 and 4. This frame 20 swings about the pivot bolt 21, so that the knives may be in the horizontal position when cutting the cane.

Since it is desirable to adjust the position of the knives relative to the height of the cane row, and also to the height to which it is desired to cut the cane near its bottom, some means for raising and lowering the swinging frame 20 should be provided; and to accomplish this I preferably lift the front end of the main frame relative to the front axle, which is done by means of the lifting screws 71 shown in Figs. 1, 2 and 3. These lifting screws are journaled in the lugs 72, carried by the posts 73 (see Fig. 1), fast to the upper bolster 10, and pass through nuts 74 carried by the main frame. These screws are turned by means of the bevel gears 75 and 76, the bevel gear 76 being mounted on the shaft 77, which shaft is driven by belt and pulley arrangement from the main engine as will be hereinafter described. The front axle may be turned about the king bolt 14 by a suitable sprocket chain bridle 78, passing over the sprocket wheel 79, mounted on the shaft 80 which is driven in any convenient way, as by the sprocket wheel 81 and sprocket chain 82, which latter is driven from the main engine in any suitable way. The rear traction wheels 9 are driven by the sprocket chains 83, which pass over the sprocket wheels 84, fast to the driving wheels 9, respectively, and these sprocket chains pass over driving pinions 85 on the main driving shaft 86, which is driven by the sprocket chains 87 from the main engine 88. From this main driving shaft 86 the various working parts of the apparatus are driven, as will now be described.

In order to raise or lower the front end of the main frame, the driving shaft 86 is provided with a loose clutch member 89, connected to the pulley 90, and this loose clutch member may be connected to the shaft by means of the sliding clutch member 91 and operating lever 92 (see Fig. 3). The pulley 90 is connected by a belt 93 to the pulley 94 journaled in the main frame (see Fig. 4), and this pulley is connected by another belt 95 to the pulley 96 on the shaft 97. This shaft is provided with a pulley, not shown, engaging the belt 98 (see Figs. 3 and 4), which belt drives the pulley 99 on the shaft 77 and thus operates the lifting screws 71 so that when this clutch member 91 is thrown into engagement the main driving shaft will cause the front end of the main frame to be raised or lowered, thereby raising or lowering the cutting knives.

It will be obvious that whenever clutch members are required in the operation of the various parts hereinafter described, they will be supplied, as it would be no invention to supply such members whenever needed and these are omitted for sake of clearness in the drawings. The driving wheels 9 are driven direct from the main shaft 86, and the hoisting screws 71 are driven by the belt and pulley mechanism hereinbefore described. The steering mechanism for swinging the front axle and the hoisting derrick are driven from the main engine, or in any convenient way, or separate devices for operating these may be adopted if desired; such details, however, forming no part of the invention, are omitted from the drawings.

Mounted between the uprights 3 of the main frame, above the main shaft 86, are two countershafts 100 and 101, (see Figs. 1 and 4). The shaft 101 is omitted from Fig. 3, and the shaft 100 is shown broken away in the center in said figure. These two countershafts 100 and 101 are driven from the main shaft 86 by means of the belts 102 and 103, respectively, or by suitable gearing instead of said belts.

The countershaft 100 carries a pulley 104 which drives the belt 105, which drives the pulley 106 on the shaft 107 (see Figs. 1, 2 and 4); and mounted on this shaft 107 is a second pulley 108 which drives the belt 109 and the pulley 110, which pulley 110 drives the shaft 111 carrying the pulley 112, which drives the belt 113 and the pulley 114 carried by the shaft 32 of the paddle wheel. Thus, the paddle wheel is driven from the main engine.

The knives and conveyer are driven by the pulley 28 on the shaft 107, and the conveyer forms a belt for driving the pulley 27 which is mounted on the shaft 115 carrying the gear wheels 116, meshing with the gears 117 which drive the beveled gears 118, meshing with the beveled gears 119 on the spindles 120, carrying the knives 24.

There is shown a duplicate arrangement of belts, pulleys, etc. for driving the various parts, but it will be obvious that a single arrangement may be adopted, if desired, and that any other suitable driving mechanism may be substituted for the belt and pulley system shown in the drawings.

I do not claim any specific means of driving the various parts, as this is a mere mechanical detail which could be readily worked out by anyone skilled in the art.

The two wheels constituting the topping drum are driven from the countershaft 100 by means of the sprocket wheel 121, driving the sprocket chain 122, which drives the sprocket wheel 123 splined on the shaft 54. The fan and gripping rollers are driven from the countershaft 101 by means of the belt 130 which drives the fan shaft 131. Mounted on this fan shaft 131 are pulleys 132, carrying belts 133 driving the pulleys 134 and 135 (see Fig. 1), on the shafts 136 and 137 of the gripping rollers 40. These are preferably made of suitable elastic gripping material, preferably similar to a pneumatic automobile tire, so that they may adapt themselves to various sizes of stalks of cane passing through the same.

The operation of the device is as follows:—The machine is driven straddling the cane row, and if there is any inequality in the ground the swinging frame 20 will hang vertically, causing the rotary knives to assume a horizontal position, the frame being adjusted so that the knives will be at the proper height above the top of the row. The cane whether standing straight, or blown down, or bent, will be caught between the front guides, and the upper portions of the cane stalks engaging these guides will be directed to the conveyer and the cross bars of the conveyer will lift the cane upward, while at the same time the paddle wheel will force the tops of the stalks, leaves, etc. in toward the conveyer, and the heads having the leaves on them will project up into the pocket in rear of the stripper 36. The trash and leaves taken off by the stripper, and loosened by the paddle wheel, will be caught by the fan and blown through the air trunk 68. The tops of the stalks passing through the stripper will be gripped by the gripping rollers 40 which are geared to travel at a higher rate of speed than the conveyer, and the stalks are pulled through the stripper from the top toward the bottom.

When the tops of the stalks rise high enough they strike the deflector 41, and the stalks fall over on the chute 42, whence they slide down green ends foremost to the topping drum, where the green ends of the cane project into the pockets 57, having the adjustable bottoms as described, and the rotation of the topping drum causes the topping knife 56 to cut off a short length from the top of the stalk. The stalk now separated into two parts is carried along with the rotary drum and the longer and sweeter part of the stalk falls toward the outer end of the hopper 60, while the short top ends of the stalk fall into the inner end of the hopper and accumulate there. The longer portions of the stalk fall on slings, not shown, previously placed across the bottom of the hopper, and are hoisted out by the derrick. The tops or green ends accumulating in the lower end of the hopper may be released therefrom by opening the bottom door 63, or they may be otherwise removed, if desired.

The apparatus is propelled by the traction wheels driven by the main engine, and these wheels may be driven separately, or together, if desired. The apparatus is steered by the steering mechanism connected to the front axle, as shown.

By having the knives and conveyer mounted on a swinging frame, as shown, not only will the said frame adapt itself to inequalities of the ground, but where the cane stalks rise irregularly from a row this swinging motion of the frame allows the lateral adjustment of the knives, which thus operate with greater efficiency than if the frame carrying the knives and the conveyer were rigidly attached to the main frame of the machine.

By varying the depth of the pockets 57, the length of the green top to be cut off may be varied as desired. This is especially important, as certain fields of cane are apt to be much more green than others, due to rank growth, or other causes, and in such cases it is desirable to cut off a greater length of the top of the stalk than in cases where the cane is very ripe. By having the air trunk 68 centrally-disposed, as shown, the leaves and trash are thrown down immediately in rear of the knives, and are deposited on the top of the stubble from which the stalks have just been cut. This is generally desirable outside of the tropics, to protect the stubble from injury by frost in winter, so it may germinate or ratoon properly in the spring.

While I have shown diagrammatically means for driving the various parts, I do not mean to limit my invention to any particular driving means, as these will lie within the skill of the ordinary mechanic.

Instead of the means shown for propelling the apparatus, any other suitable means may be provided if desired.

It will be obvious that various modifications might be made in the herein described structure, and in the construction, combination and arrangement of parts which might be used without departing from the spirit of my invention.

Having thus described my invention, what I claim and desire to secure by Letters Patent of the United States is:—

1. In a cane harvester, the combination with a main frame and a swinging frame hinged thereto, of cutting and delivering mechanism carried by said swinging frame, a stripper mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and a hopper adapted to receive the stalks after they leave said topping drum, substantially as described.

2. In a cane harvester, the combination with a main frame and a swinging frame hinged thereto, of cutting and delivering mechanism carried by said swinging frame, a stripper mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

3. In a cane harvester, the combination with a main frame and a swinging frame hinged thereto, of cutting and delivering mechanism carried by said swinging frame, a stripper mounted on said main frame above said swinging frame, gripping rollers mounted above said stripper, a deflector mounted above said gripping rollers, a chute provided adjacent to said gripping rollers opposite said deflector, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

4. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, means for rotating said topping drum, and means for cutting the tops from said stalks while in said topping drum, substantially as described.

5. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, means for rotating said topping drum, means for cutting the tops from said stalks while in said topping drum, and an inclined hopper adapted to receive the two portions of the divided stalks after they leave said topping drum, substantially as described.

6. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, said topping drum comprising two concentric wheels spaced apart and provided with radial partitions, a topping knife mounted in the space between said wheels, and means for rotating both of said concentric wheels in the same direction, substantially as described.

7. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, said topping drum comprising two concentric wheels spaced apart and provided with radial partitions, a topping knife mounted in the space between said wheels, means for rotating both of said concentric wheels in the same direction, and an inclined hopper adapted to receive the two portions of the divided stalks after they leave said topping drum, substantially as described.

8. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, said topping drum comprising two concentric wheels spaced apart and provided with radial partitions, and said inner wheel being provided with a series of pockets having adjustable bottoms, a topping knife mounted in the space between said wheels, and means for rotating both of said concentric wheels in the same direction, substantially as described.

9. In a cane harvester, the combination with a main frame and cutting and stripping mechanism carried thereby, of a chute for receiving the stalks top foremost from said stripping mechanism, a topping drum mounted at the lower end of said chute and receiving the top ends of the cane stalks therefrom, said topping drum comprising two concentric wheels spaced apart and provided with radial partitions, and said inner wheel being provided with a series of pockets having adjustable bottoms, a topping knife mounted in the space between said wheels, means for rotating both of said concentric wheels in the same direction, and an inclined hopper adapted to receive the two portions of the divided stalks after they leave said topping drum, substantially as described.

10. In a cane harvester, the combination with a main frame and a swinging frame hinged thereto, of cutting and delivering mechanism carried by said swinging frame, a stripper mounted on said main frame above said swinging frame, gripping rollers mounted above said stripper, a chute adjacent to said gripping rollers, a topping drum mounted at the lower end of said chute and receiving the top ends of the cane stalks therefrom, with means for cutting the tops from said stalks while in said topping drum, substantially as described.

11. In a cane harvester, the combination with a main frame and a swinging frame hinged thereto, of cutting and delivering mechanism carried by said swinging frame, a stripper mounted on said main frame above said swinging frame, gripping rollers mounted above said stripper, a chute adjacent to said gripping rollers, a topping drum mounted at the lower end of said chute and receiving the top ends of the cane stalks therefrom, with means for cutting the tops from said stalks while in said topping drum, and an inclined hopper adapted to receive the two portions of the divided stalks after they leave said topping drum, substantially as described.

12. In a cane harvester, the combination with a main frame and a swinging frame hinged thereto, of cutting and delivering mechanism carried by said swinging frame, a stripper comprising a resilient plate, dentated at its outer edge, mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and a hopper adapted 13. In a cane harvester, the combination with a main frame and a swinging frame hinged thereto, of cutting and delivering mechanism carried by said swinging frame, a stripper comprising a resilient plate dentated at its outer edge mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

14. In a cane harvester, the combination with a main frame and a swinging frame hinged thereto, of cutting and delivering mechanism carried by said swinging frame, a stripper comprising a resilient plate dentated at its outer edge mounted on said main frame above said swinging frame, gripping rollers mounted above said stripper, a deflector mounted above said gripping rollers, a chute provided adjacent to said gripping rollers opposite said deflector, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

15. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and having paddles hinged to the periphery thereof parallel to the axis of said wheel, and adapted to press the cane stalks against said conveyer, a stripper mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and a hopper adapted to receive the stalks after they leave said topping drum, substantially as described.

16. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and having paddles hinged to the periphery thereof parallel to the axis of said wheel, and adapted to press the cane stalks against said conveyer, a stripper mounted on said main frame above said swinging frame, gripping rollers mounted above said stripper, a chute provided adjacent to said gripping rollers, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

17. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and having paddles hinged to the periphery thereof parallel to the axis of said wheel, and adapted to press the cane stalks against said conveyer, a stripper mounted on said main frame above said swinging frame, gripping rollers mounted above said stripper, a deflector mounted above said gripping rollers, a chute provided adjacent to said gripping rollers opposite said deflector, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

18. In a cane harvester, the combination with a main frame and a swinging frame hinged thereto, of cutting and delivering mechanism carried by said swinging frame, a stripper mounted on said main frame above said swinging frame, gripping rollers mounted above said stripper, an air trunk mounted on said main frame, a fan adapted to direct the leaves and trash separated from the cane stalks into said air trunk, a chute adjacent to said gripping rollers, a topping drum mounted at the lower end of said chute and receiving the top ends of the cane stalks therefrom, with means for cutting the tops from said stalks while in said topping drum, substantially as described.

19. In a cane harvester, the combination with a main frame and a swinging frame hinged thereto, of cutting and delivering mechanism carried by said swinging frame, a stripper mounted on said main frame above said swinging frame, gripping rollers mounted above said stripper, an air trunk mounted on said main frame, a fan adapted to direct the leaves and trash separated from the cane stalks into said air trunk, a chute adjacent to said gripping rollers, a topping drum mounted at the lower end of said chute and receiving the top ends of the cane stalks therefrom, with means for cutting the tops from said stalks while in said topping drum, and an inclined hopper adapted to receive the two portions of the divided stalks after they leave said topping drum, substantially as described.

20. In a cane harvester, the combination with a main frame and a swinging frame hinged thereto, of cutting and delivering mechanism carried by said swinging frame, a stripper mounted on said main frame above said swinging frame, an air trunk mounted on said main frame, a fan adapted to direct the leaves and trash separated from the cane stalks into said air trunk, gripping rollers mounted above said stripper, and means for topping the cane stalks after leaving said gripping rollers, substantially as described.

21. In a cane harvester, the combination with a main frame and a swinging frame hinged thereto, of cutting and delivering mechanism carried by said swinging frame, a stripper mounted on said main frame above said swinging frame, an air trunk mounted on said main frame, a fan adapted to direct the leaves and trash separated from the cane stalks into said air trunk, gripping rollers mounted above said stripper, means for topping the cane stalks after leaving said gripping rollers, and an inclined hopper adapted to receive the two portions of the divided stalks after they leave said topping drum, substantially as described.

22. In a cane harvester, the combination with a main frame and a swinging frame hinged thereto, of cutting and delivering mechanism carried by said swinging frame, a stripper comprising a resilient plate dentated at its outer edge mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, substantially as described.

23. In a cane harvester, the combination with a main frame and a swinging frame hinged thereto, of cutting and delivering mechanism carried by said swinging frame, a stripper mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, substantially as described.

24. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and having paddles hinged to the periphery thereof parallel to the axis of said wheel, and adapted to press the cane stalks against said conveyer, a stripper mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, substantially as described.

25. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and adapted to press the cane stalks against said conveyer, a stripper mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, substantially as described.

26. In a cane harvester, the combination with a main frame and a swinging frame hinged thereto, of cutting and delivering mechanism carried by said swinging frame, said delivering mechanism comprising a slatted conveyer, and a paddle wheel located in front of said conveyer and having paddles hinged to the periphery thereof parallel to the axis of said wheel, and adapted to press the cane stalks against said conveyer, a stripper consisting of a dentated resilient plate mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, substantially as described.

27. In a cane harvester, the combination with a main frame and a swinging frame hinged thereto, of cutting and delivering mechanism carried by said swinging frame, a stripper mounted on said main frame above said swinging frame, an air trunk mounted on said main frame, a fan adapted to direct the leaves and trash separated from the cane stalks into said air trunk, gripping rollers mounted above said stripper, with means for topping the stalks after leaving said gripping rollers, a chute provided adjacent to said gripping rollers, a topping drum mounted at the lower end of said chute and receiving the top ends of the cane stalks therefrom, means for cutting the tops from said stalks while in said topping drum, and an inclined hopper adapted to receive the two portions of the divided stalks after they leave said topping drum, substantially as described.

In testimony whereof, I affix my signature.

JOHN CURRY CORBIN.